US007487386B2

(12) United States Patent
Everhart et al.

(10) Patent No.: US 7,487,386 B2
(45) Date of Patent: Feb. 3, 2009

(54) METHOD FOR INCREASING FILE SYSTEM AVAILABILITY VIA BLOCK REPLICATION

(75) Inventors: Craig F. Everhart, Chapel Hill, NC (US); Soumitra Sarkar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 11/093,521

(22) Filed: Mar. 30, 2005

(65) Prior Publication Data

US 2006/0230074 A1    Oct. 12, 2006

(51) Int. Cl.
*G06F 11/00*  (2006.01)
(52) U.S. Cl. .......................................... 714/6; 711/162
(58) Field of Classification Search ...................... 714/6, 714/5; 711/161, 162
See application file for complete search history.

(56) References Cited

U.S. PATENT DOCUMENTS

| | | | | |
|---|---|---|---|---|
| 5,941,999 | A * | 8/1999 | Matena et al. ................... | 714/6 |
| 7,024,530 | B2 * | 4/2006 | Jarvis et al. ................... | 711/162 |
| 7,069,402 | B2 * | 6/2006 | Coulter et al. ................ | 711/162 |
| 7,133,982 | B2 * | 11/2006 | Werner et al. ................. | 711/161 |
| 7,277,997 | B2 * | 10/2007 | Vincent ....................... | 711/162 |
| 2003/0158869 | A1 * | 8/2003 | Micka ......................... | 707/203 |
| 2003/0208511 | A1 | 11/2003 | Earl et al. | |
| 2004/0010487 | A1 * | 1/2004 | Prahlad et al. ................ | 707/1 |
| 2006/0020762 | A1 * | 1/2006 | Urmston ...................... | 711/162 |
| 2006/0143413 | A1 * | 6/2006 | Agombar et al. ............. | 711/162 |

FOREIGN PATENT DOCUMENTS

WO    WO 2004/025517 A1    3/2004

* cited by examiner

*Primary Examiner*—Robert Beausoliel
*Assistant Examiner*—Philip Guyton
(74) *Attorney, Agent, or Firm*—Kunzler & McKenzie (57) ABSTRACT

According to one embodiment, a method is disclosed herein that includes creating a flashcopy of initial replica data, performing a recovery of the created flashcopy, and exporting the recovered flashcopy. In one implementation, the method includes determining whether the initial replica data has changed data, generating an updated flashcopy based on the determination, sequentially quiescing an export of the recovered flashcopy, switching the recovered flashcopy with the updated flashcopy, and exporting the switched flashcopy. In another implementation, the method includes determining whether to reexport a new flashcopy, creating a flashcopy of updated replica data, recovering the flashcopy of the updated replica data, exporting the current recovered flashcopy of the updated replica data, replacing the previously exported recovered flashcopy based on the exportation of the current recovered flashcopy, and deleting the previously exported recovered flashcopy based on the exportation of the current recovered flashcopy.

4 Claims, 9 Drawing Sheets

METHOD FOR INCREASING FILE SYSTEM AVAILABILITY VIA BLOCK REPLICATION

FIELD OF INVENTION

The present invention generally relates to block level replication of SCSI logical units ("LU"), also referred to as storage volumes. The present invention specifically relates to building file system level replication system utilizing block level replication, to provide high-availability read-only access to file system data.

BACKGROUND OF THE INVENTION

Existing (synchronous and asynchronous) block replication schemes across storage systems are generally useful for disaster recovery. Specifically, if a source site fails, then a target site can take over the function of the source site. Because the dynamic/volatile server state at the source, including cached data, is not necessarily present at a target site when a disaster causes the source server to fail, a server on the target site must generally perform system or application level recovery of the replicated data before beginning service at the target site. For example, in a logging file system, before a replica of a storage volume at a remote site can be used as a live file system, the file system log must be replayed. Specifically, the data structures on a storage volume are not always mutually consistent as they are being updated; generally, any update might affect more than one stored data structure, and the stored structures cannot all be updated simultaneously. Different architectures for storage applications have different ways of managing this temporary inconsistency: some will use an idempotent operations log to record intended updates, replaying those operations after a restart. Some will instead sweep over all data structures after a restart looking for inconsistencies to repair. In both cases, the objective is to repair the consistency of data structures after a system restart.

Another problem that would ideally be solved by a data replication scheme is that of making data available at multiple sites simultaneously, by having multiple replicas that provide access to read-only versions of the source data. Block replication alone is not sufficient to solve this problem because of the recovery steps necessary to allow a server to provide access to the underlying data. Server software cannot track changes to data in a storage volume it uses, and update its own cache of that data. Having data replicated at multiple sites is valuable because it allows for greater data availability in the face of network failures, e.g., the inability to connect to some but not all of the sites with replicated data.

In contrast, a file system replication scheme such as rsync will allow for concurrent data update and highly-available read-only access, because the data updates are flowing through the file system itself, updating the server cache as well as the disk data. With "rsync," a process running as a file system application at a source site communicates over a network with a process running as a file system application at a destination site. The process at the source site reads the current state of a set of files and transmits that current state to the process at the destination site, and the process at the destination site adjusts the state of the corresponding files at the destination site to mirror those at the source site. However, such schemes are limited in performance compared to block replication schemes because the latter typically leverages specialized hardware and firmware.

Either block replication or file replication are useable for disaster recovery, as required for the "recovery" step after a crash making use of the data copy available. However, block replication does not by itself increase availability or load-balancing, which is possible with file system replication, but with less performance than available with block replication.

It is therefore a challenge for the computer industry to develop techniques for exploiting the advantages of block-level replication schemes to implement file system replication schemes.

SUMMARY OF THE INVENTION

A first embodiment of the present invention is a signal bearing medium tangibly embodying a program of machine-readable instructions executable by a processor of a target server to perform operations comprising generating a flashcopy of a replica volume and performing a recovery of the flashcopy of the replica volume in response to the replica volume being a replication of a first storage volume received by a target storage system from a source storage system; and exporting data of the recovered flashcopy of the replica volume whereby the recovered flashcopy of the replica volume is made available to a client.

A second embodiment of the present invention is a target server employing a processor, and a memory for storing instructions operable with the processor, the instructions being executed for generating a flashcopy of a replica volume and performing a recovery of the flashcopy of the replica volume in response to the replica volume being a replication of a first storage volume received by a target storage system from a source storage system; and exporting data of the recovered flashcopy of the replica volume whereby the recovered flashcopy of the replica volume is made available to a client.

A third embodiment of the present invention is a target server comprising means for generating a flashcopy of a replica volume and performing a recovery of the flashcopy of the replica volume in response to the replica volume being a replication of a first storage volume received by a target storage system from a source storage system; and means for exporting data of the recovered flashcopy of the replica volume whereby the recovered flashcopy of the replica volume is made available to a client.

A fourth embodiment of the present invention is method involving a generation of a flashcopy of a replica volume and performing a recovery of the flashcopy of the replica volume in response to the replica volume being a replication of a first storage volume received by a target storage system from a source storage system; and an exportation of data of the recovered flashcopy of the replica volume as requested by a client whereby the recovered flashcopy of the replica volume is made available to a client.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

The present invention provides a new and unique file system replication mechanism providing high-availability read-only access to data via block-level replication by proposing a scheme for supporting read-only file system replication at one or more sites that exploits high performance synchronous and asynchronous block-level replication schemes, by periodically creating flashcopies of underlying target block devices, adjusting the contents of those flashcopies to reflect stable file system state at a target site, and then reexporting the content using distributed file system protocols such as Network File System ("NFS").

Figure 1:
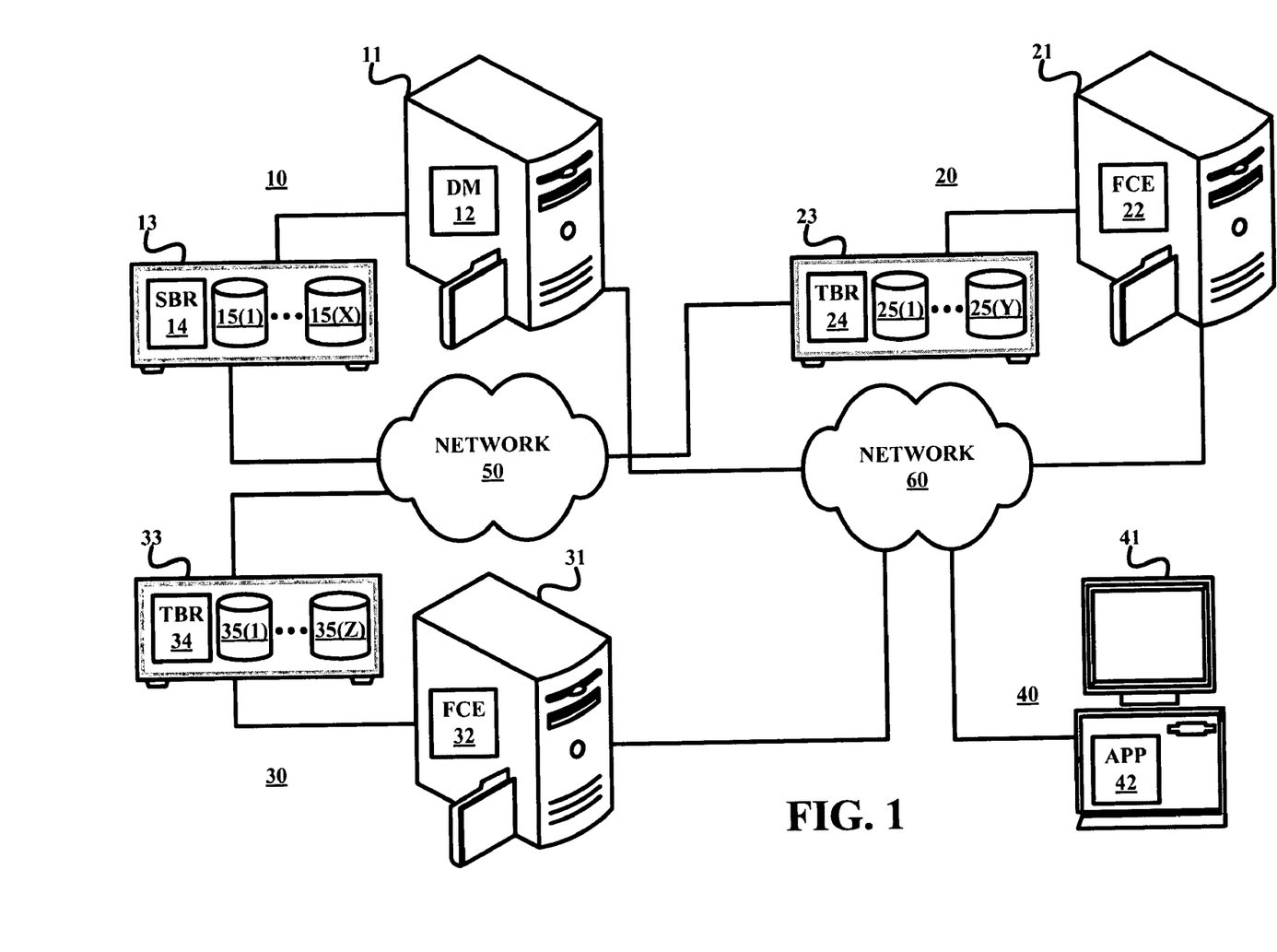
FIG. 1 illustrates an exemplary embodiment of a block replication system in accordance with the present invention.

FIG. 1 exemplarily illustrates a block level replication system of the present invention employing a source site 10, a target site 20, a target site 30 and a client site 40. Source site 10 includes a source server 11 and a source storage system 13. Target site 20 includes a target server 21 and a target storage system 23. Target site 30 includes a target server 31 and a target storage system 33. Client site 40 includes a client system 41 running an application ("APP") 42, which makes file I/O requests that can be satisfied by source server 11, target server 21 and/or target server 31.

Operation of source server 11 encompasses a data modifier 12 responding to either requests from local applications (not shown) on source server 11 and/or requests from distributed file system clients driven by applications on network 60 (e.g., application 42) whereby data modifier 12 generates data that is stored in one or more of X number of source logical units 15 stored in source storage system 13, where X≧1. A source block replication module ("SBR") 14 of source storage system 13 communicates source data blocks via a network 50 (e.g., a storage area network) to a target block replicator ("TBR") 24 of target storage system 23 whereby target block replicator 24 processes the source data blocks to generate and store replica data within one or more of Y number of replica logical units 25, where Y≧1. Similarly, source block replication module 14 communicates the source data blocks via a network 50 to a target block replicator ("TBR") 34 of target storage system 33 whereby target block replicator 34 processes the source data blocks to generate and store replica data within one or more of Z number of replica logical units 35, where Z≧1. Multiple replicas are desirable for ensuring the availability of some copy of the data to the ultimate client on site 40 in spite of partial network failures, such as between sites 20 and 40, but not between sites 30 and 40. Multiple replicas are also useful for balancing the load from many such clients like 40.

Figure 2:
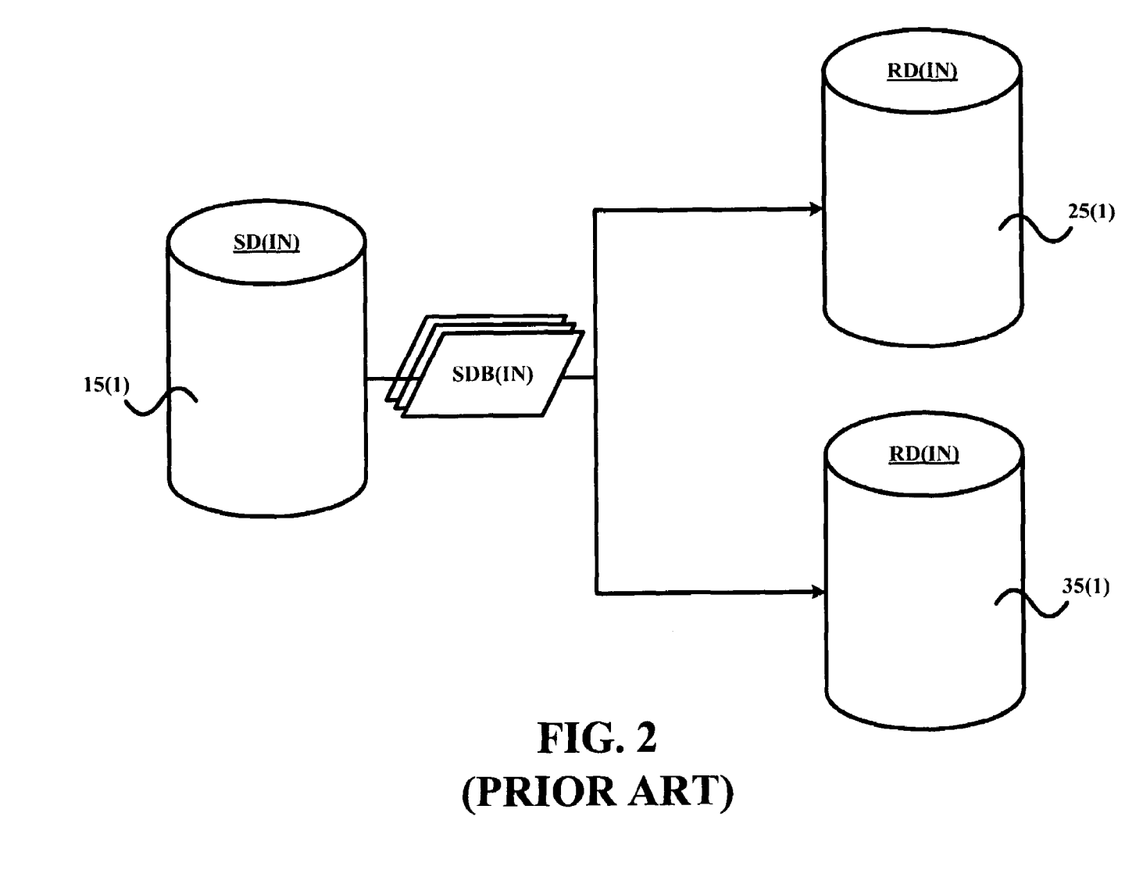
FIGS. 2 and 3 illustrate an exemplary block replication of source data as known in the art.
Figure 3:
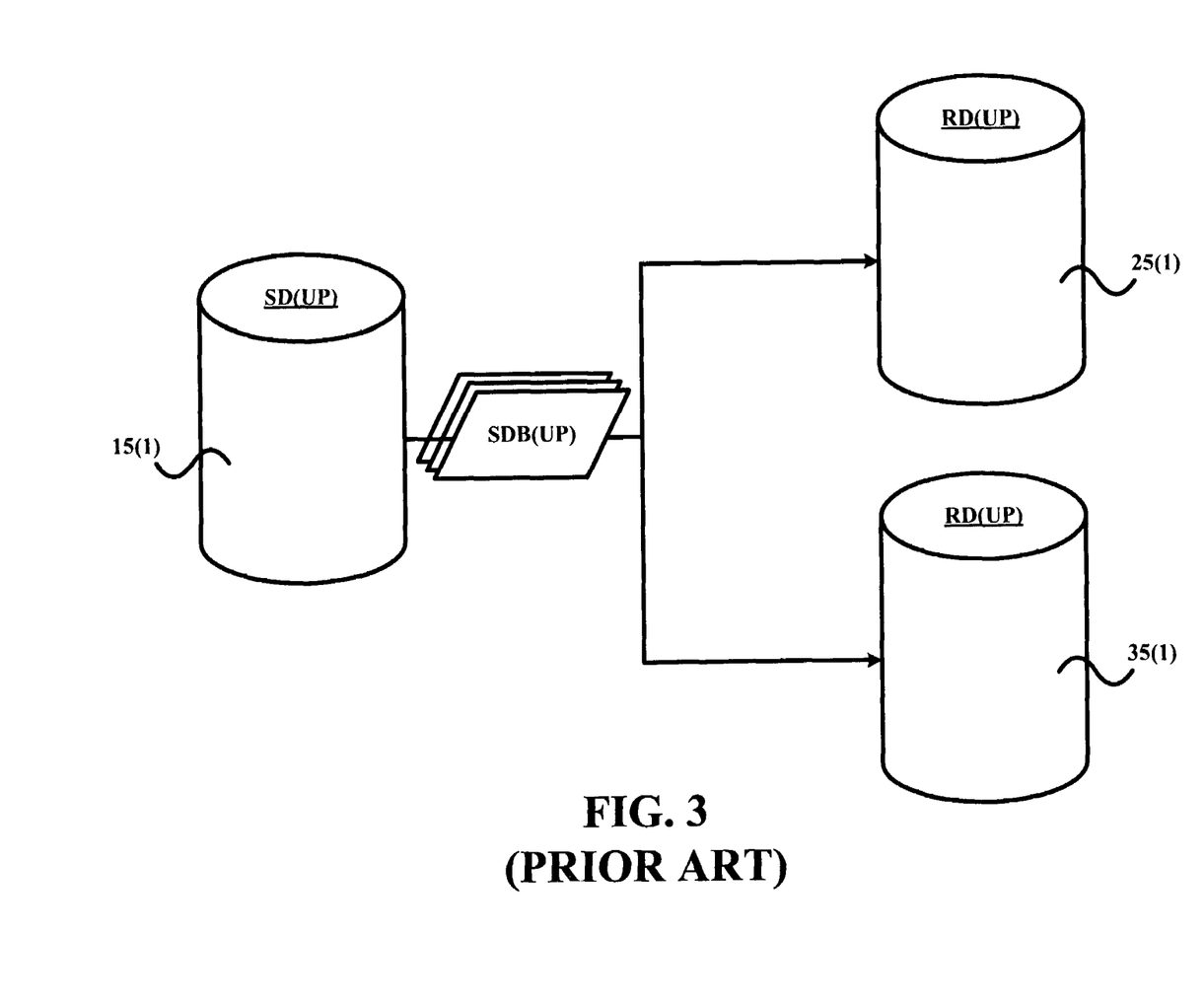

For example, as illustrated in FIG. 2, source data blocks SDB(IN) of source data SD(IN) initially stored within a source logical unit 15(1) can be communicated by source block replicator 14 to target block replicators 24 and 34, which process the initial source data blocks SDB(IN) to generate and store initial replica data RD(IN) within a replica logical unit 25(1) and a replica logical unit 35(1), respectively. Thereafter, as illustrated in FIG. 3, updated source data blocks SDB(UP) representing updated source data SD(UP) stored within source logical unit 15(1) can be communicated by source block replicator 14 to target block replicators 24 and 34, which process updated source data blocks SDB(UP) to generate and store updated replica data RD(UP) within respective replica logical units 25(1) and replica logical unit 35(1). The updating of the replica data RD(UP) within replica logical units 25(1) and 35(1) can be repeated indefinitely.

Referring to FIGS. 1-3, availability via network 60 of replica data RD stored within replica logical unit 25(1) and replica logical unit 35(1) to client 41 (i.e., an exportation of replica data RD) has traditionally been infeasible in view of an inability of respective target servers 21 and 31 prior to the present invention to handle updates to replica data RD stored within respective replica logical units 25(1) and 35(1) while the replica data RD is being exported via network 60. Specifically, each update to replica data RD stored within replica logical unit 25(1) and replica logical unit 35(1) would introduce major inconsistencies in the exportation of the replica data RD via network 60.

To overcome this drawback, the present invention provides a flashcopy exporter (FCE) in each of the target servers. In the example of FIG. 1, flash copy exporters 22 and 32 are installed on target server 21 and 31, respectively. In operation, flashcopy exporter 22 and flashcopy exporter 32 provide consistent high-availability read-only access by application 42 on client 41 to replica data RD as stored within replica logical unit 25(1) and replica logical unit 35(1), respectively, while the replica data RD in each of the targets 20 and 30 may be or may not be in the process of being updated. To this end, flashcopy exporter 22 and flashcopy exporter 32 implement a flowchart 70 as illustrated in FIG. 4 that is representative of a replica data exportation method of the present invention.

Figure 4:
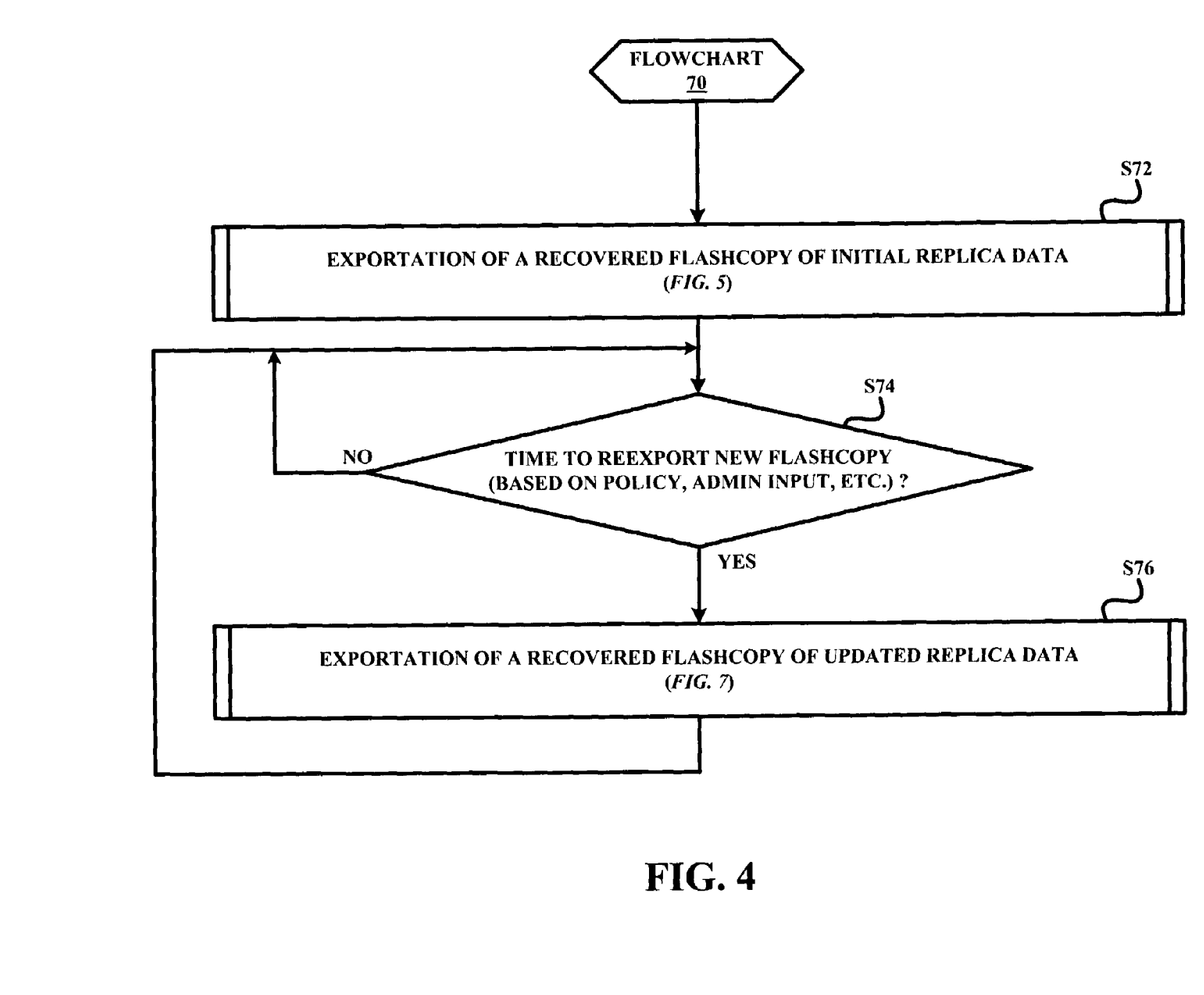
FIG. 4 illustrates a flowchart representative of a replica data exportation method in accordance with the present invention.

Referring to FIG. 4, a stage S72 of flowchart 70 encompasses flashcopy exporter 22 and flashcopy exporter 32 implementing an exportation of a recovered flashcopy of replica data as initially stored within respective replica logical units 25(1) and 35(1), and a stage S76 of flowchart 70 encompasses flashcopy exporter 22 and flashcopy exporter 32 implementing an exportation of each recovered flashcopy of the stored replica data as updated within respective replica logical units 25(1) and 35(1). Those having ordinary skill in the art will appreciate that a recovery of a flashcopy of replica data ensures that various parts of the data are mutually consistent in preparation for use and export.

Stage S76 can be repeated indefinitely by flashcopy exporter 22 and flashcopy exporter 32 in view of the fact that an updating of the replica data stored within respective replica logical units 25(1) and 35(1) can be repeated indefinitely. A decision stage S74 of flowchart 70 controls when stage S76 is executed. One embodiment of the logic behind the decision making process of stage S74 will be subsequently described below.

Figure 5:
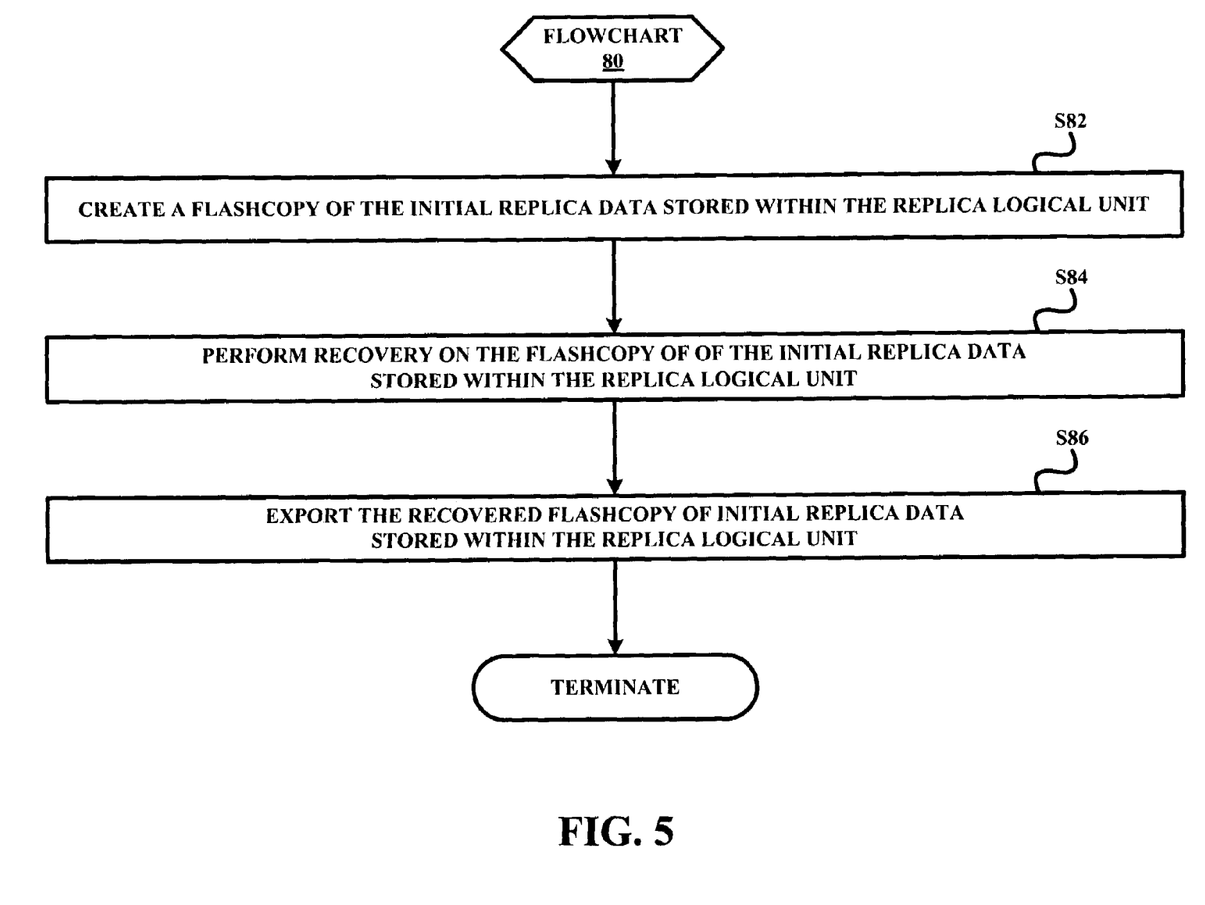
FIG. 5 illustrates a flowchart representative of an initial replica data exportation method in accordance with the present invention.
Figure 7:
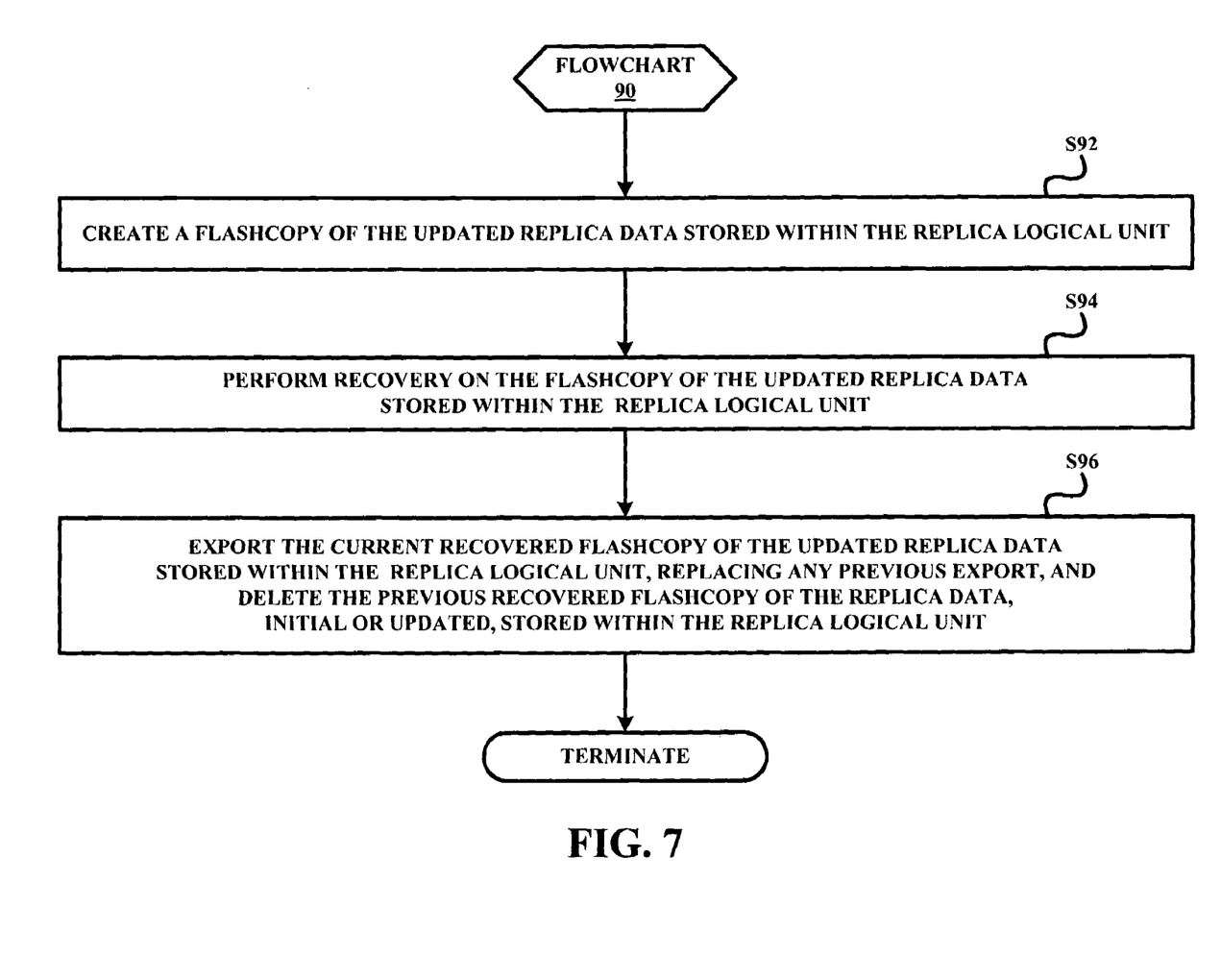
FIG. 7 illustrates a flowchart representative of an updated replica data exportation method in accordance with the present invention.

As illustrated in FIG. 5, a flowchart 80 representative of an initial replica data exportation method of the present invention is one embodiment of stage S72, and as illustrated in FIG. 7, a flowchart 90 representative of an updated replica data exportation method of the present invention is one embodiment of stage S76. In practice, the manner by which flashcopy exporter 22 and flashcopy exporter 32 execute stages S72 and S76 is without limit. Thus, the following description of flowcharts 80 and 90 is not a limitation as to the scope of flowchart 70.

Referring to FIGS. 1, 2 and 5, a stage S82 of flowchart 80 encompasses flashcopy exporter 22 and flashcopy exporter 32 creating a flashcopy of initial replica data RD(IN) stored within respective replica logical unit 25(1) and replica logical unit 35(1). A stage S84 of flowchart 80 encompasses flashcopy exporter 22 and flashcopy exporter 32 performing a recovery of the flashcopies of initial replica data RD(IN) stored within respective replica logical unit 25(1) and replica logical unit 35(1). The data in replica logical units 25(1) and 35(1) will be identical whereby, in view of the fact that replica logical units 25(1) and 35(1) are at different geographical locations, multiple concurrent copies of the data is provided to ensure the availability of some copy of the data to the application site 40. A stage S86 of flowchart 80 encompasses flashcopy exporter 22 and flashcopy exporter 32 exporting the recovered flashcopies of initial replica data RD(IN) stored within respective replica logical unit 25(1) and replica logical unit 35(1) via network 60 to client 41 as requested by a copy of application 42 installed on client 41.

Figure 6:
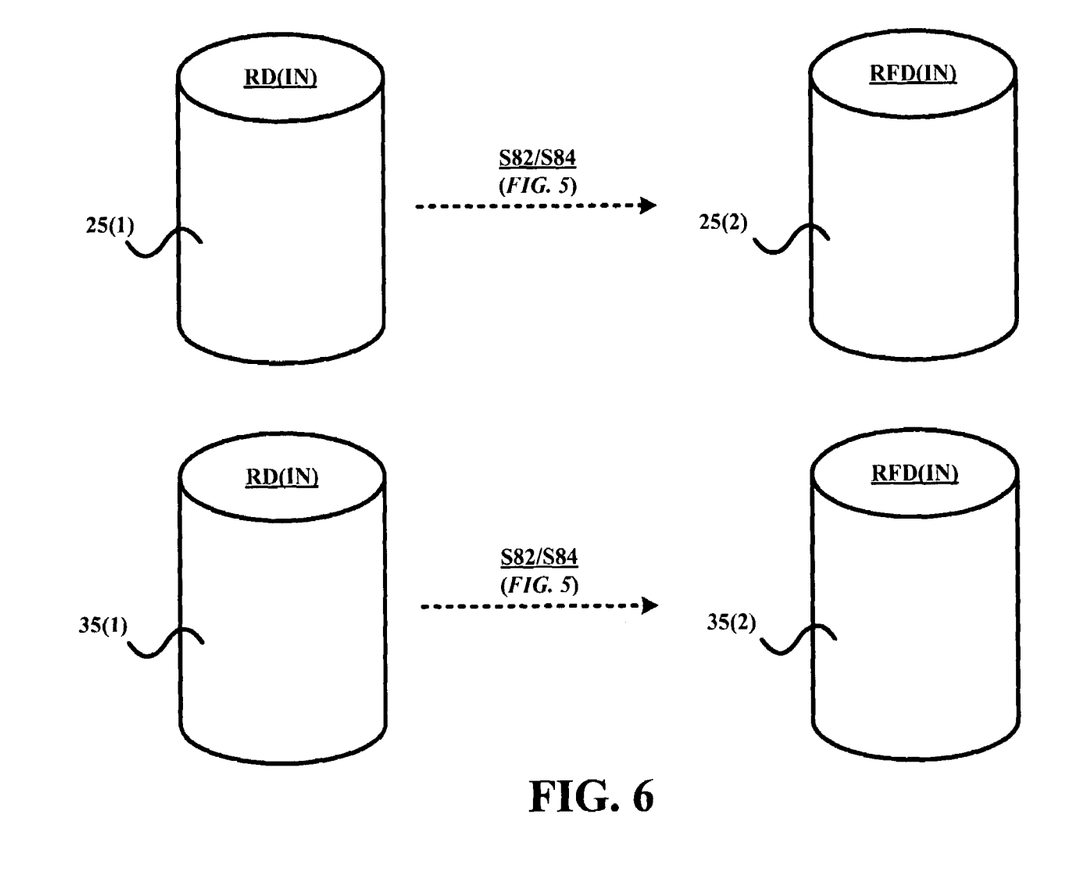
FIG. 6 illustrates an exemplary operation of the flowchart illustrated in FIG. 5.

For example, as illustrated in FIGS. 2 and 6, initial replica data RD(IN) stored within replica logical unit 25(1) and replica logical unit 35(1) is processed in accordance with stages S82 and S84 (FIG. 5) to thereby yield a recovered flashcopy logical unit 25(2) and a recovered flashcopy logical unit 35(2), both of which store recovered flashcopies RFD(IN) of the initial replica data RD(IN) stored within respective replica logical units 25(1) and 35(1). Data of the recovered flashcopies RFD(IN) is exported by respective flashcopy exporters 22 and 32 as requested by application 42 on client 41 (FIG. 1), which thus gets high-availability read-only access to the copy of the file system data in RFD(IN).

Referring to FIGS. 1, 5 and 6, a stage S74 of flowchart 70 encompasses flashcopy exporter 22 and flashcopy exporter 32 determining whether an update of the recovered flashcopies RFD(IN) of the initial replica data RD(IN) is warranted. In one embodiment, flashcopy exporter 22 and flashcopy exporter 32 query respective target block replicators 24 and 34 to determine if any new updates have been made to the replica data stored within respective replica logical units 25(1) and 35(1). Flashcopy exporter 22 and flashcopy exporter 32 will make the determination in stage S74 based on (1) the amount of updates made to the replica data stored within respective replica logical units 25(1) and 35(1), and (2) an update policy specifying when it is appropriate to update the recovered flashcopies RFD(IN) of the initial replica data RD(IN). Those having ordinary skill in the art will appreciate that the update policy includes factors other than the amount of updates made to the replica data. Those other factors may also be considered by flashcopy exporters 22 and 32 during stage S74.

If flashcopy exporter 22 and flashcopy exporter 32 determine during stage S74 that an update to the recovered flashcopies RFD(IN) of the initial replica data RD(IN) is not warranted, then flashcopy exporter 22 and flashcopy exporter 32 return to stage S74 to repeat, at a later time, the determination as to whether an update to the recovered flashcopies RFD(IN) of the replica data RD(IN) is warranted.

If flashcopy exporter 22 and flashcopy exporter 32 determine during stage S74 that an update the recovered flashcopies RFD(IN) of the initial replica data RD(IN) is warranted, then flashcopy exporter 22 and flashcopy exporter 32 implement flowchart 90 in stage S76 as stated above.

Referring to FIGS. 1, 3 and 7, a stage S92 of flowchart 90 encompasses flashcopy exporter 22 and flashcopy exporter 32 creating a flashcopy of updated replica data RD(UP) stored within respective replica logical unit 25(1) and replica logical unit 35(1). Again, the data stored in replica logical units 25(1) and 35(1) are the same for purposes of redundantly providing the data in multiple locations to address availability and to facilitate the service of a greater load than a single site can provide. A stage S94 of flowchart 90 encompasses flashcopy exporter 22 and flashcopy exporter 32 performing a recovery of the flashcopies of updated replica data RD(UP) stored within respective replica logical unit 25(1) and replica logical unit 35(1). A stage S96 of flowchart 90 encompasses flashcopy exporter 22 and flashcopy exporter 32 exporting the recovered flashcopies of updated replica data RD(UP) stored within respective replica logical unit 25(1) and replica logical unit 35(1) via network 60 to client 41 as requested by a copy of application 42 installed on client 41. Stage S96 further encompasses a deletion of the previous recovered flashcopies of replica data RD, initial or updated, stored within respective replica logical unit 25(1) and replica logical unit 35(1).

Figure 8:
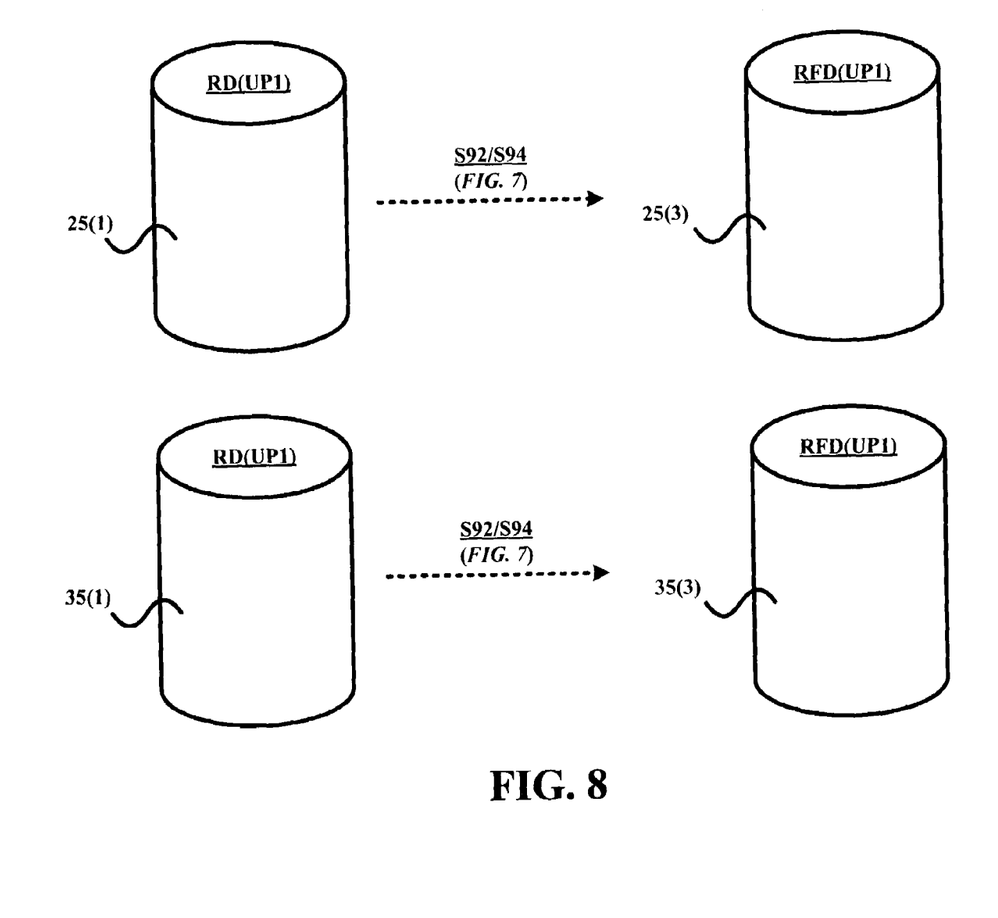
FIGS. 8 and 9 illustrate exemplary successive operations of the flowchart illustrated in FIG. 7.

For example, as illustrated in FIG. 8, a first set of updated replica data RD(UP1) stored within replica logical unit 25(1) and replica logical unit 35(1) is processed in accordance with stages S92 and S94 (FIG. 7) to thereby yield a recovered flashcopy logical unit 25(3) and a recovered flashcopy logical unit 35(3), both of which store recovered flashcopies RFD (UP1) of the first set of updated replica data RD(UP1) stored within respective replica logical units 25(1) and 35(1). Data of the recovered flashcopies RFD(UP1) is exported by respective flashcopy exporters 22 and 32 as requested by application 42 on client 41 (FIG. 1), which thus gets high-availability read-only access to the copy of the file system data in recovered flashcopies RFD(UP1). This access by client 40 will continue until the first set of updated replica data RD(UP1) stored within replica logical units 25(1) and 35(1) is itself updated.

Figure 9:
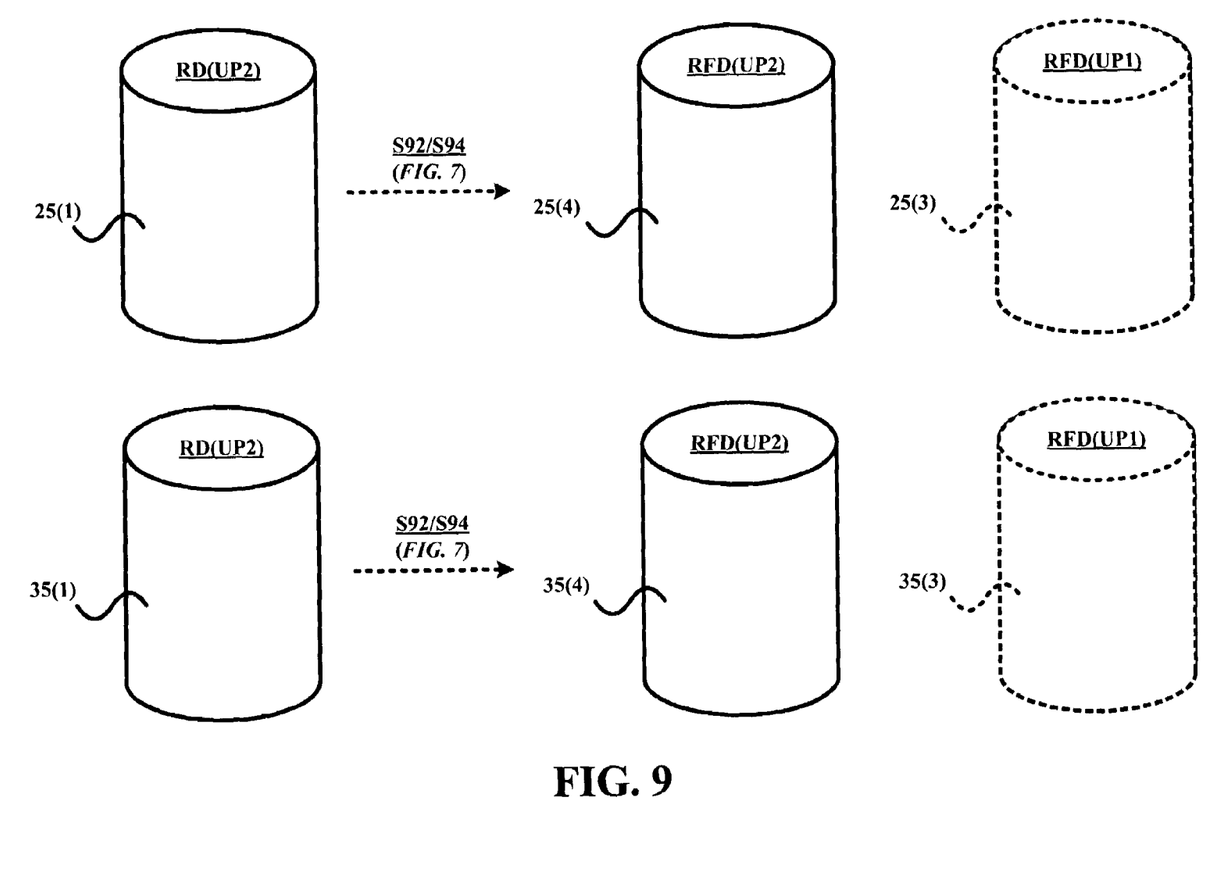

For example, as illustrated in FIG. 9, a second set of updated replica data RD(UP2) stored within replica logical unit 25(1) and replica logical unit 35(1) is processed in accordance with stages S92 and S94 (FIG. 7) to thereby yield a recovered flashcopy logical unit 25(4) and a recovered flashcopy logical unit 35(4), both of which store recovered flashcopies RFD(UP2) of the second set of updated replica data RD(UP1) stored within respective replica logical units 25(1) and 35(1). Data of the recovered flashcopies RFD(UP2) is exported by respective flashcopy exporters 22 and 32 as requested by application 42 on client 41 (FIG. 1), which thus gets high-availability read-only access to the copy of the file system data in recovered flashcopies RFD(UP2). This access by client 40 will continue until the second set of updated replica data RD(UP2) stored within replica logical units 25(1) and 35(1) is itself updated and flowchart 90 is completed. Additionally, recovered flashcopy logical unit 25(3) and a recovered flashcopy logical unit 35(3) are deleted.

Referring again to FIG. 7, those having ordinary skill in the art will appreciate that switching to a new recovered flashcopy of updated replica data from the previous recovered flashcopy of updated replica data may present operational problems that can be prevented by sequentially quiescing an exportation of the previous recovered flashcopy of the updated replica data, performing the switch, and enabling an exportation of the new recovered flashcopy of the updated replica data. In an application based system embodiment, a failure indication is provided to an application that opened a file prior to the switch when the opened file is invalid after the switch. In a filesystem embodiment, the client would be programmed to know in principle when a switch has occurred to thereby prevent any operational problems. This is conventionally accomplished by applications using the NFS protocol.

For purposes of facilitating an understanding of the present invention, the various methods of the present invention are described herein in the context of the block level replication system illustrated in FIG. 1. Nonetheless, those having ordinary skill in the art will appreciate how to implement the various methods of the present invention in the context of other block level replication systems having one or more target sites providing one or more data sources for network applications (e.g., application 42 shown in FIG. 1).

From the preceding description of FIGS. 1-9, those having ordinary skill in the art will appreciate numerous advantages of the present invention. Foremost among such advantages is high-availability read-only access to data via block-level replication.

Referring to FIG. 1, in one practical embodiment, modules 14, 24 and 34 are conventional software applications, while flashcopy exporters 22 and 32 are embodied in a new software module installed within a memory of respective servers 21 and 31 whereby the processor(s) of respective servers 21 and 31 can execute respective flashcopy exporters 22 and 32 to implement flowcharts 70, 80 and 90 as exemplarily illustrated in FIGS. 4, 5 and 7, respectively. Flashcopy exporters 22 and 32 when embodied as a software module can be written in any programming language by those having ordinary skill in the art appreciating the description herein of FIGS. 1-9.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method comprising:
    generating a first replica data volume, the first replica data volume comprising a backup of initial source data;
    generating a second replica data volume, the second replica data volume comprising a backup of initial source data;
    generating a first flashcopy of the first replica data volume;
    generating at least a second flashcopy of the second replica data volume;
    performing a recovery of the first flashcopy to obtain a first recovered flashcopy;
    performing a recovery of the second flashcopy to obtain a second recovered flashcopy;
    receiving a request for initial source data from an application;
    exporting the initial source data from one of the first recovered flashcopy and second recovered flashcopy to the application based on the received request;
    determining whether one of the first replica data volume and second replica data volume has changed data;
    generating an updated first flashcopy based on the determination;
    generating an updated second flashcopy based on the determination;
    sequentially quiescing an export of the first recovered flashcopy;
    switching the first recovered flashcopy with the updated first flashcopy; and
    exporting the switched flashcopy.

2. A method comprising:
    creating a flashcopy of initial replica data stored in a replica logical unit;
    performing a recovery of the created flashcopy;
    exporting the recovered flashcopy;
    determining whether to reexport a new flashcopy;
    creating a flashcopy of updated replica data stored within the replica logical unit;
    recovering the flashcopy of the updated replica data;
    exporting the current recovered flashcopy of the updated replica data;
    replacing at least one previously exported recovered flashcopy based on the exportation of the current recovered flashcopy; and
    deleting at least one previously exported recovered flashcopy based on the exportation of the current recovered flashcopy.

3. The method of claim 2 wherein the determination of whether to reexport a new flashcopy is based on a policy.

4. The method of claim 2 wherein the determination of whether to reexport a new flashcopy is based on an administrator input.

* * * * *